United States Patent
Freeman

(10) Patent No.: US 6,697,715 B1
(45) Date of Patent: Feb. 24, 2004

(54) INSTINCTIVE STEERING SYSTEM AND METHOD FOR REDUCING OPERATOR ERROR IN CONTROLLING A VEHICLE REMOTELY

(75) Inventor: Douglas Freeman, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 67 days.

(21) Appl. No.: 10/175,528

(22) Filed: Jun. 19, 2002

(51) Int. Cl.[7] .................................................. G06F 7/00
(52) U.S. Cl. ................................................ 701/2; 701/3
(58) Field of Search .................................. 244/45 R, 13; 246/15, 14, 49, 137.3, 139, 194, 16, 190; 340/988, 989, 990; 342/357, 457; 701/3, 200, 2, 24, 4, 120, 213

(56) References Cited

U.S. PATENT DOCUMENTS 5,923,270 A * 7/1999 Sampo et al. ............... 340/988
6,460,810 B2 * 10/2002 James ......................... 244/190
6,626,398 B1 * 9/2003 Cox et al. ................... 244/45 R

* cited by examiner

Primary Examiner—Richard M. Camby
(74) Attorney, Agent, or Firm—Donald G. Peck; Harvey A. Gilbert

(57) ABSTRACT

A method for controlling operation of a remotely piloted vehicle by an operator. The method includes the steps of accepting an operator directional command from a control device, accepting a control device compass reading, adding the operator directional command to the control device compass reading to generate a heading command, and sending the remotely piloted vehicle the heading command. In this manner, the method of the present invention relieves the operator of having to orient himself relative to the direction of the vehicle in order to control the vehicle and thereby provides for instinctive control of the vehicle through elimination of observer translation.

13 Claims, 6 Drawing Sheets

INSTINCTIVE STEERING SYSTEM AND METHOD FOR REDUCING OPERATOR ERROR IN CONTROLLING A VEHICLE REMOTELY

GOVERNMENT RIGHTS

The invention described herein may be manufactured and used by or for the Government of the United State of America for governmental purpose without payment of any royalties thereon or therefor.

BACKGROUND OF THE INVENTION

The present invention generally relates to remotely piloted vehicle control systems and, more specifically, to an instinctive steering system and method for reducing operator error in controlling a vehicle remotely.

When remotely piloted vehicles are controlled by an operator using a joystick, the joystick movements are transmitted as vehicle turn commands via a communications link such as radio frequency waves to a receiver mounted on the vehicle. The vehicle turn commands are interpreted onboard the vehicle and used to control the movement of the vehicle.

In such a system, the operator relies upon visual information in making joystick movements. Thus, for example, when the vehicle is moving away from the operator, a joystick movement to the left causes the vehicle to move to the left. However, when the vehicle is moving toward the operator, operator steering must be accomplished through joystick movements which are contrary to and opposite from the operator's instinctive response. In this case, the operator must perform a mental translation to correctly steer the vehicle.

A remotely piloted vehicle control system is disclosed in Statutory Invention Registration H1,469. A computer generates a control stream at a communication port indicative vehicle operator commands. A transmitter, responsive to the control signal, transmits a radio frequency control signal to the remotely piloted vehicle which interprets the control stream and causes the vehicle to turn as the operator commanded. While the disclosed control system provides for operation of the remotely piloted vehicle using any computer equipped with a communications port, it does not provide for instinctive operator control.

As can be seen, there is a need for a system and method of steering a remotely piloted vehicle which provides for instinctive control by the operator. Such a system and method preferably provides steering control of the remotely piloted vehicle by the operator independent of the operator's orientation to the direction of travel of the vehicle. Further, such a system and method preferably takes advantage of the operator's instinctive response to control the vehicle. Finally, such a system and method preferably simplifies operator control of the vehicle and increases safety by reducing operator reaction time and eliminating steering errors due to observer translation.

SUMMARY OF THE INVENTION

In one aspect of the present invention, a method for controlling operation of a remotely piloted vehicle by an operator includes the steps of accepting an operator directional command from a control device, adding the control device directional command to a control device compass reading to determine a heading command, and providing the heading command to the remotely piloted vehicle. In this manner, the method of the present invention eliminates observer translation by relieving the operator of having to mentally or physically orient himself relative to the direction of the vehicle in order to control the vehicle and thereby provides for instinctive control of the vehicle.

In another aspect of the present invention, a method for controlling operation of a remotely piloted vehicle by an operator includes the steps of accepting an operator directional command from a control device, accepting a control device compass reading, accepting a vehicle compass reading, adding the operator directional command to the control device compass reading to generate a heading command, combining the heading command with the vehicle compass reading to generate a steering angle command, and sending the remotely piloted vehicle the steering angle command.

In yet another aspect of the present invention, a system for controlling operation of a remotely piloted vehicle by an operator includes a processor operable to perform the method steps of the invention. Also provided is a computer readable medium having code segments for performing the method steps of the invention.

In another aspect of the present invention, a computer readable media for controlling operation of a remotely piloted vehicle by an operator includes a code segment for accepting an operator directional command from a control device, a code segment for adding the operator directional command to a control device compass reading to determine a heading command, and a code segment for sending the remotely piloted vehicle the heading command.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a method for controlling operation of a remotely piloted vehicle by an operator. The method includes the steps of accepting an operator directional command from a control device; adding the operator directional command and a control device compass reading to determine a heading command; and providing the heading command to the remotely piloted vehicle. For a vehicle which cannot accept heading commands, the heading command can be combined with the vehicle compass reading to produce a steering angle command. This commanded steering angle can then be provided to the remotely piloted vehicle. In this manner, the method of the present invention relieves the operator of having to orient himself relative to the direction of the vehicle in order to control the vehicle and thereby provides for instinctive control of the vehicle.

Figure 1:
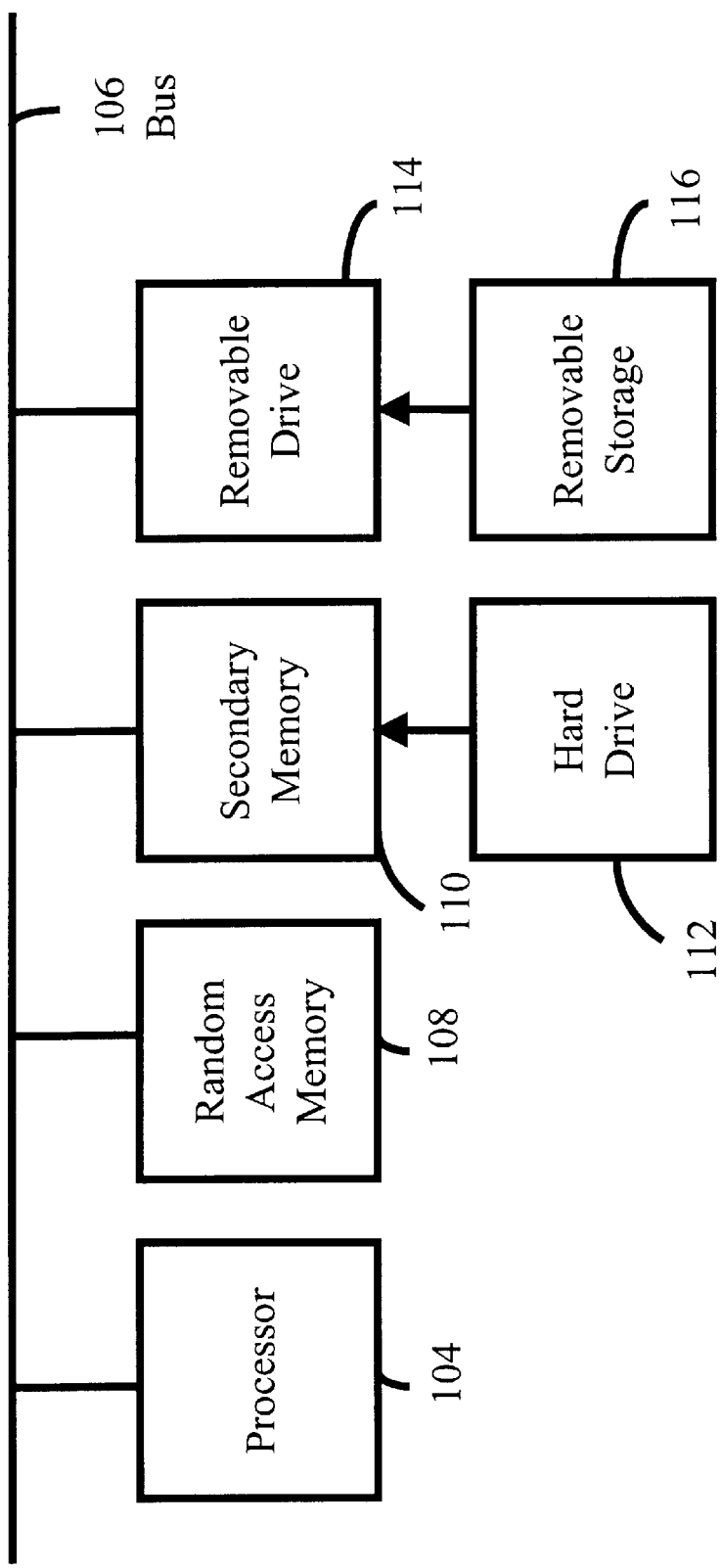
FIG. 1 illustrates a prior art schematic representation of a computer system.

One embodiment of the present invention includes computer software executing within a computer system. FIG. 1 shows an exemplary computer system generally designated 100. The computer system 100 may include one or more processors, such as processor 104 connected to a bus 106.

The computer system 100 also may include a main memory 108, preferably random access memory (RAM), and a secondary memory 110. The secondary memory 110 may include a hard disk drive 112 and a removable storage device 114, such as a floppy disk drive, a magnetic tape drive, and a compact disk drive. The removable storage drive 114 reads from and/or writes to a removable storage unit 116 in any manner well known in the art.

Removable storage unit 116, also called a program storage device or a computer program product, represents computer readable media which may include a floppy disk, magnet tape, and a compact disk. The removable storage unit 116 may include a computer usable storage medium having therein stored computer software and/or data.

Computer programs (also called computer control logic including code segments) may be stored in main memory 108 and/or secondary memory 110. Such computer programs, when executed, enable the computer system 100 to perform the functions of the present invention as further described herein. In particular, the computer programs, when executed, enable the processor 104 to perform the functions of the present invention. Accordingly, such computer programs represent controllers of the computer system 100.

Alternative embodiments of the present invention are directed to a computer program product comprising a computer readable medium having code segments (computer software) stored therein. The code segments, when executed by the processor 104, causes the processor 104 to perform the functions as further described herein.

Further embodiments of the present invention are implemented primarily in hardware using, for example, a hardware state machine (not shown). Implementation of the hardware state machine so as to perform the functions described herein will be apparent to persons skilled in the relevant arts.

Figure 2:
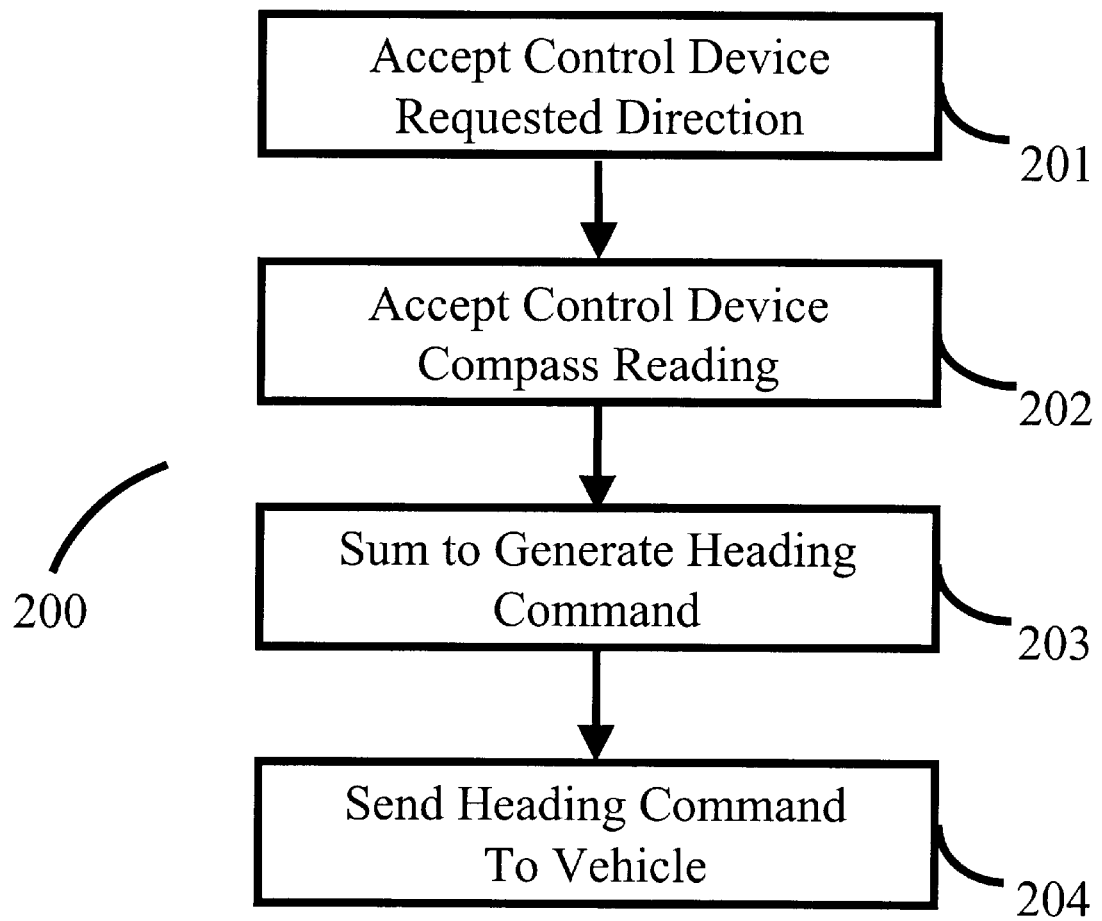
FIG. 2 illustrates a flow chart of a method of the present invention.

With reference to FIG. 2, an embodiment of the present invention includes a method generally designated 200 for commanding a remotely piloted vehicle by way of a control device that accepts direction inputs representative of operator requests. The control device may include a joystick. Additionally, both the control device and the vehicle include a directional device which may include a compass. The vehicle may contain a computation unit which accepts heading commands from the operator and steers the vehicle to the commanded heading. A vehicle may be limited to only accepting commanded steering angles, in which case the commanded heading may be combined with the vehicle compass reading to produce the commanded steering angle.

A control device requested direction and a control device compass reading can be input to the method 200 in steps 201 and 202 respectively. In a step 203, the control device requested direction can be summed with the control device compass reading to generate a heading command. The heading command can be sent to the vehicle by means of the communications link resulting in vehicle commanded heading in a step 204.

Figure 3:
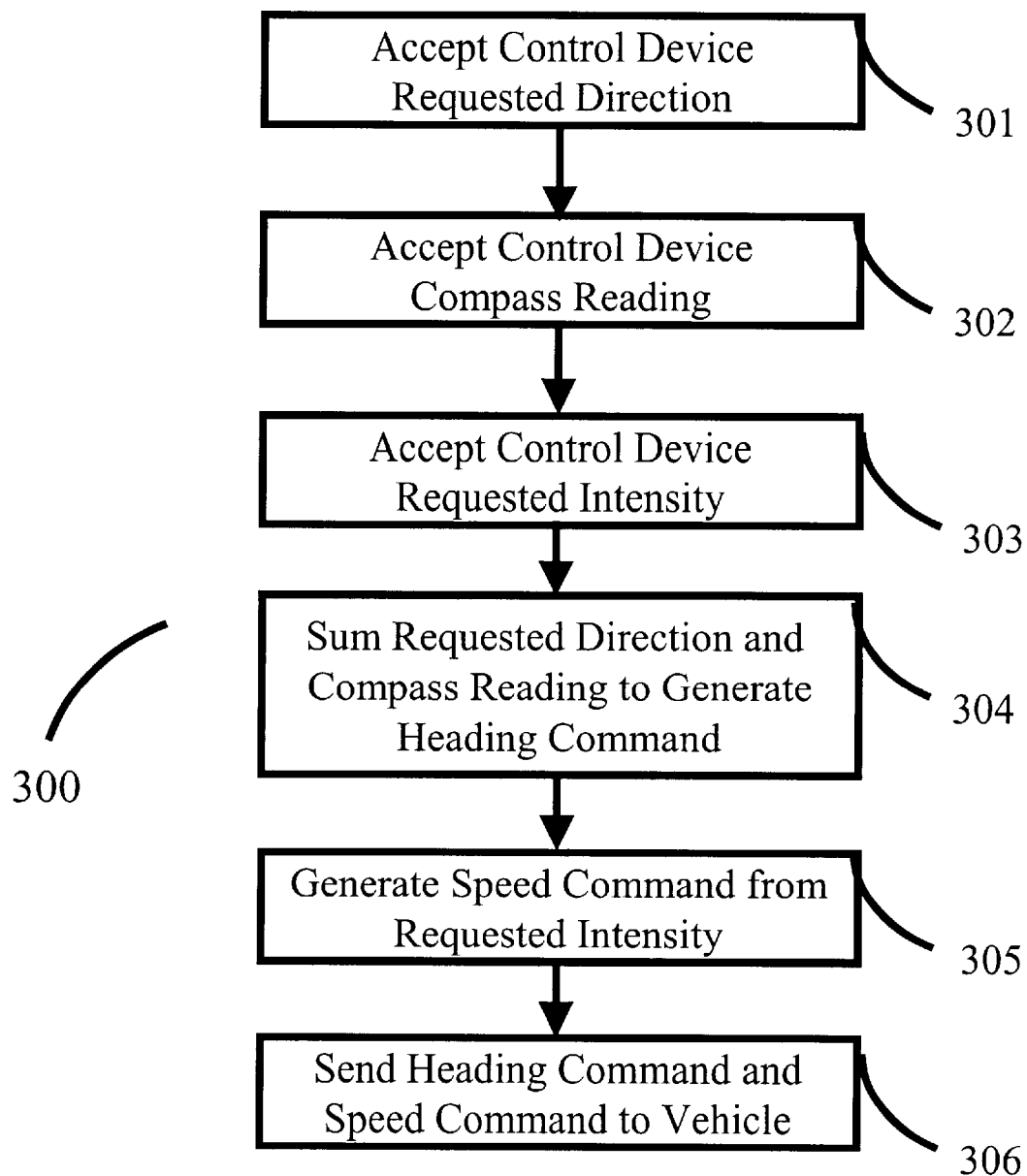
FIG. 3 illustrates a flow chart of an alternative embodiment of the present invention.

An alternative embodiment of the present invention shown in FIG. 3 includes a method generally designated 300 for commanding a remotely piloted vehicle by way of a control device that accepts direction and intensity inputs representative of operator requests. The method 300 assumes the vehicle speed command is determined from requested intensity of the operator control device.

A control device requested direction, a control device compass reading and a control device requested intensity can be input to the method 300 in steps 301, 302, and 303 respectively. In a step 304, the control device requested direction can be summed with the control device compass reading to generate a heading command. The heading command together with a speed command generated in a step 305 from the control device requested intensity may be sent to the vehicle by means of the communications link resulting in vehicle commanded heading and commanded speed in a step 306.

Figure 4:
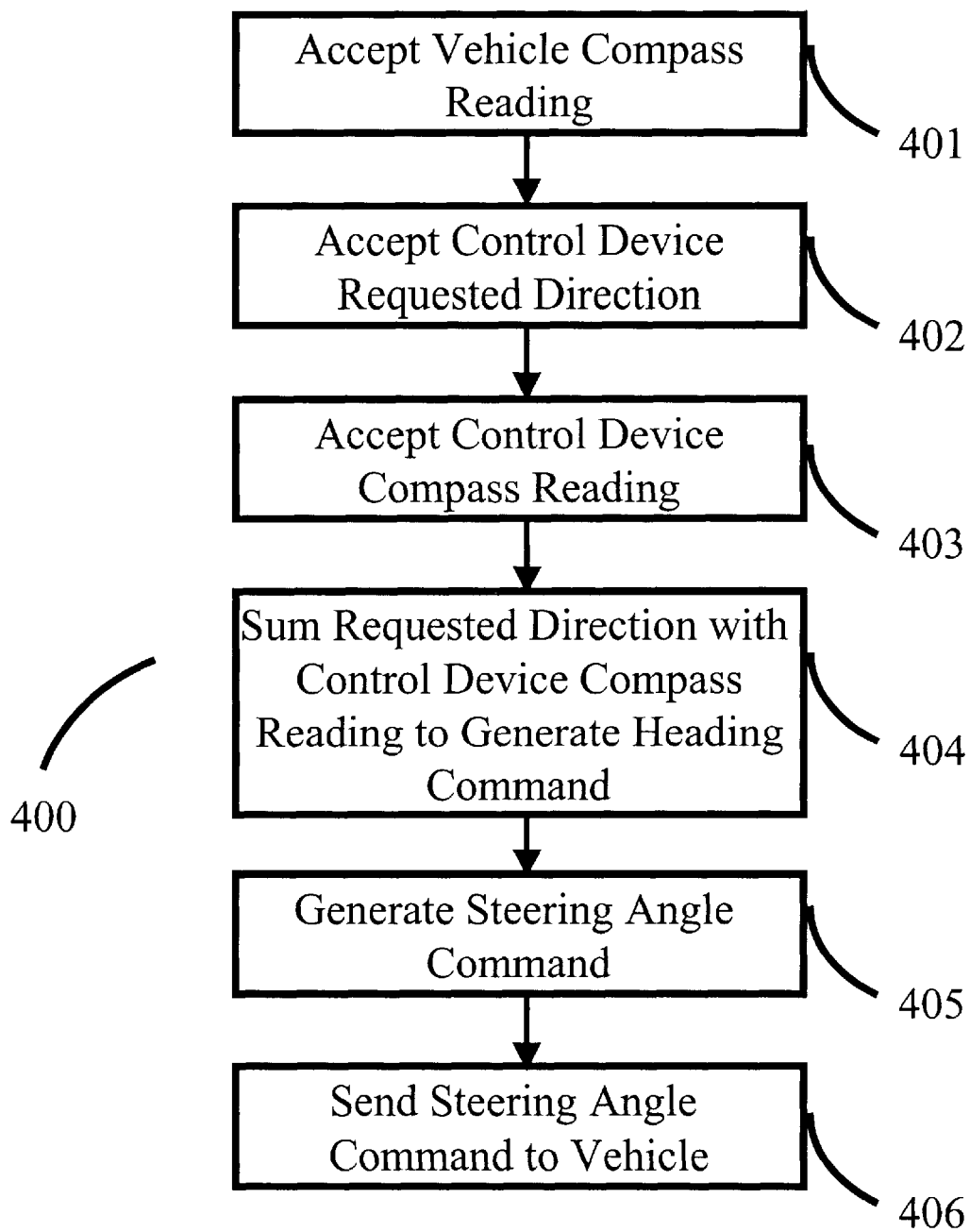
FIG. 4 illustrates a flow chart of another embodiment of the present invention.

An alternative embodiment of the present invention shown in FIG. 4 includes a method generally designated 400 for commanding a remotely piloted vehicle by way of a control device that accepts direction inputs representative of operator requests. A remotely piloted vehicle does not accept heading commands, but does accept steering angle commands.

A vehicle compass reading, a control device requested direction, and a control device compass reading can be input to the method 400 in steps 401, 402, and 403 respectively. In a step 404 the control device requested direction and the control device compass reading can be summed to generate a heading command. The vehicle compass reading and the heading command can be provided to an autopilot subsystem in a step 405. The autopilot subsystem generates a steering angle command. The steering angle command may be sent to the vehicle by means of the communications link resulting in vehicle command steering in a step 406.

Figure 5A:
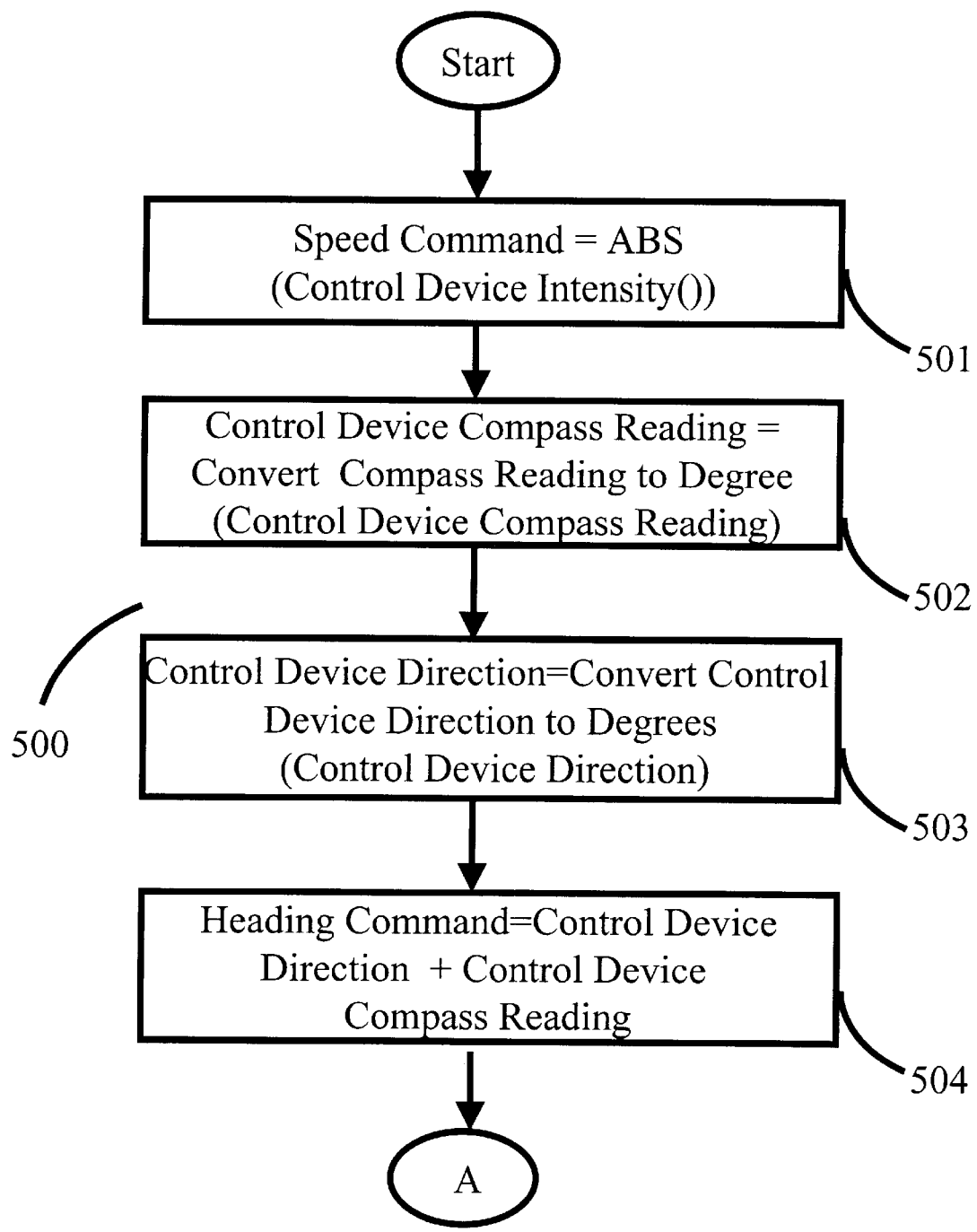
FIGS. 5a and 5b illustrate a flow chart of yet another embodiment of the present invention.
Figure 5B:
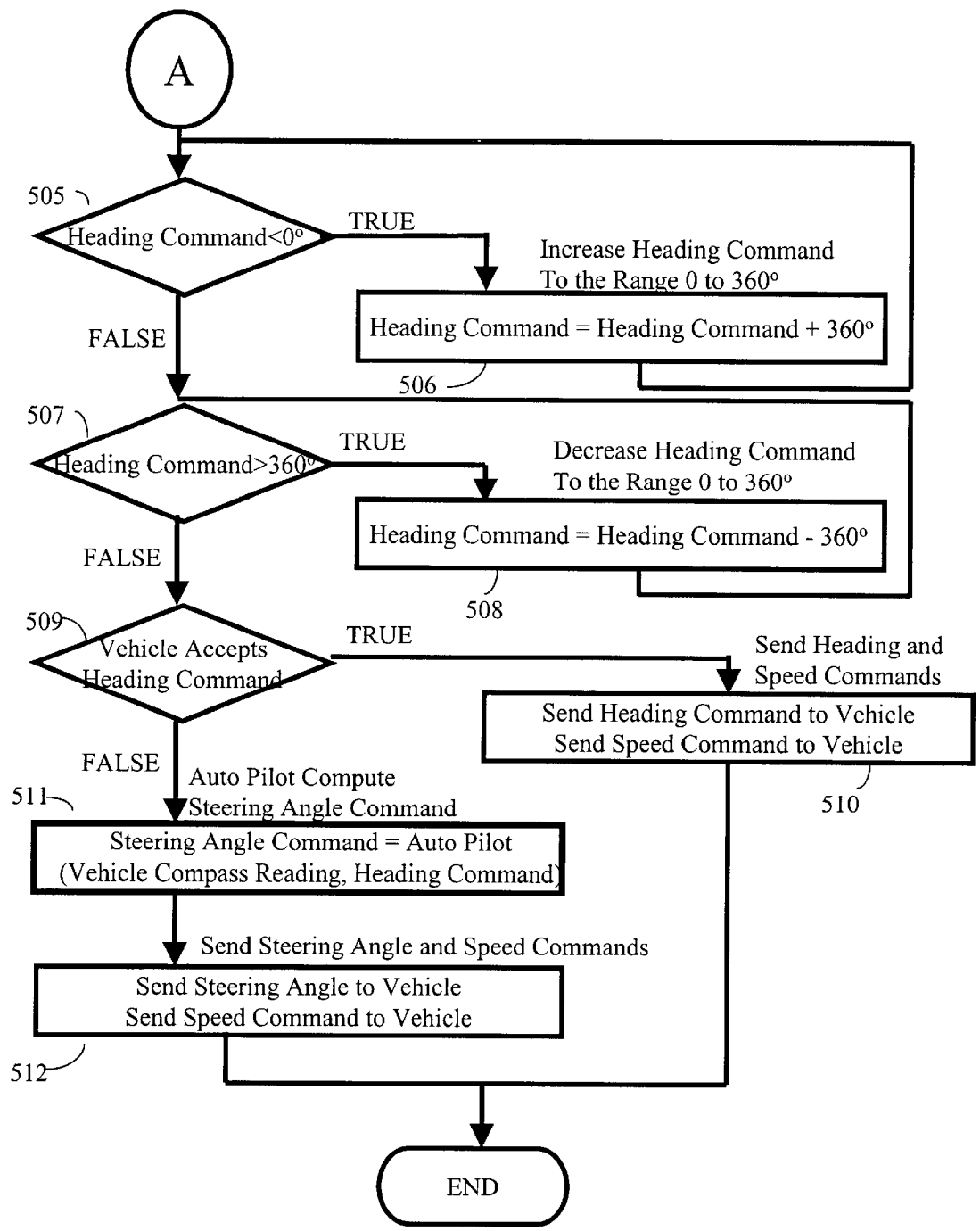

With reference to FIGS. 5a and 5b, an embodiment of the present invention is shown including a method generally designated 500 for commanding a remotely piloted vehicle by way of a control device that accepts direction inputs and intensity inputs representative of operator commands.

In a step 501 a control device intensity input can be converted to a vehicle speed command by taking the absolute value of the control device intensity. In steps 502 and 503 a control device compass reading and a control device direction can be converted to the same units respectively such as by converting the compass reading and the direction to degrees.

A heading command can be computed in a step 504 by summing the control device direction and the control device compass reading. If the heading command is less than the equivalent of 0 degrees as determined in a step 505, then the equivalent of 360 degrees may be repeatedly added to the heading command in a step 506 until the heading command is no longer less than the equivalent of 0 degrees.

In similar fashion, a determination can be made in a step 507 whether the heading command is greater than the equivalent of 360 degrees. If the heading command is greater than the equivalent of 360 degrees, then the equivalent of 360 degrees can be repeatedly subtracted from the heading command until the heading command is no longer greater than the equivalent of 360 degrees in a step 508.

In a step 509 a determination can be made whether the vehicle accepts heading commands. If the vehicle does accept heading commands, then in a step 510 the heading command and the speed command are sent to the vehicle.

Otherwise, a steering angle may be computed by an autopilot in a step 511 using a vehicle compass reading and the heading command. The steering angle and the speed command may then be sent to the vehicle in a step 512.

As will be appreciated by those skilled in the art and by way of example, when the control device compass reading is north and the operator moves the joystick north, the control device direction matches the control device orientation and the control device direction is equivalent to a north command. Also, when the control device compass reading is east and the operator moves the joystick north (control device direction is equivalent to a north command), then the heading command must be equivalent to a west command.

As can be appreciated by those skilled in the art, the method of the present invention provides for instinctive operator control of a remotely piloted vehicle. By determining a requested direction independent of the orientation of the control device, the operator is relieved of the task of orienting himself relative to the vehicle.

It should be understood, of course, that the foregoing relates to D preferred embodiments of the invention and that modifications may be made without departing from the spirit and scope of the invention as set forth in the following claims.

I claim:

1. A method for controlling operation of a remotely piloted vehicle by an operator, the method comprising the steps of:

accepting an operator directional command from a control device;

accepting a control device compass reading;

adding the operator directional command to the control device compass reading to generate a heading command; and sending the remotely piloted vehicle the heading command.

2. The method of claim 1, wherein the control device further comprises a joystick.

3. The method of claim 1, further comprising the step of determining a speed command based upon a control device requested intensity, the speed command being sent to the remotely piloted vehicle.

4. A method for controlling operation of a remotely piloted vehicle by an operator, the method comprising the steps of:

accepting an operator directional command from a control device;

accepting a control device compass reading;

accepting a vehicle compass reading;

adding the operator directional command to the control device compass reading to generate a heading command;

combining the heading command with the vehicle compass reading to generate a steering angle command; and sending the remotely piloted vehicle the steering angle command.

5. The method of claim 4, wherein the control device further comprises a joystick.

6. The method of claim 4, further comprising the step of determining a speed command based upon a control device requested intensity, the speed command being provided to the remotely piloted vehicle.

7. A system for controlling operation of a remotely piloted vehicle by an operator, the system comprising:

a memory coupled to a processor, the processor operable to accept an operator directional command from a control device, add the operator directional command to a control device compass reading to generate a heading command, and send the remotely piloted vehicle the heading command.

8. The system of claim 7, wherein the control device further comprises a joystick.

9. The system of claim 7, wherein the processor is further operable to generate a steering angle command by combining the heading command and a vehicle compass reading.

10. The system of claim 7, wherein the processor is further operable to determine a speed command based upon a control device requested intensity and to send the speed command to the remotely piloted vehicle.

11. A computer readable media for controlling operation of a remotely piloted vehicle by an operator, the computer readable media comprising:

a code segment for accepting an operator directional command from a control device;

a code segment for adding the operator directional command to a control device compass reading to determine a heading command; and a code segment for sending the remotely piloted vehicle the heading command.

12. The computer readable media of claim 11, wherein the control device further comprises a joystick.

13. The computer readable media of claim 11, further comprising a code segment for determining a speed command based upon a control device requested intensity and sending the speed command to the remotely piloted vehicle.

* * * * *